United States Patent

[11] 3,621,297

[72] Inventor Jack Allen Dean
Flemington, N.J.

[21] Appl. No. 860,591
[22] Filed Sept. 24, 1969
[45] Patented Nov. 16, 1971
[73] Assignee RCA Corporation

[54] MONOSTABLE MULTIVIBRATOR

8 Claims, 3 Drawing Figs.

[52] U.S. Cl. .......... 307/265, 307/273, 307/279, 307/293
[51] Int. Cl. .......... H03k 1/18
[50] Field of Search .......... 307/265, 266, 267, 273, 279, 293

[56] References Cited

UNITED STATES PATENTS

| | | | |
|---|---|---|---|
| 3,191,069 | 6/1965 | Sampson .......... | 307/273 X |
| 3,426,218 | 2/1969 | Baynard .......... | 307/273 X |
| 3,473,050 | 10/1969 | Groom .......... | 307/267 |
| 3,521,242 | 7/1970 | Katz .......... | 307/279 X |

*Primary Examiner*—John S. Heyman
*Attorney*—Edward J. Norton

ABSTRACT: A monostable multivibrator circuit is disclosed which provides a relatively constant width pulse despite large variations from circuit to circuit in the switching transfer voltage characteristics of two switching devices used in any one circuit; in any one circuit, each of the two switching devices have the same switching transfer voltage characteristic. The two switching devices are connected in such a manner that the first device is turned on for a time determined by a first time-constant circuit, and the second device is turned on while the first device is on plus a time determined by a second time-constant circuit. In this manner, the effect on the width of the output pulse by the transfer voltages of one device is cancelled out by the effect on the width of the transfer voltage of the other device. Thus a relatively constant width pulse always results.

INVENTOR.
JACK ALLEN DEAN
BY
Harry W. Barron
Attorney

INVENTOR.
JACK ALLEN DEAN
BY
Harry W Barron
Attorney

MONOSTABLE MULTIVIBRATOR

This invention relates to a monostable multivibrator which generates a relatively constant width output pulse.

Monostable multivibrators have numerous uses and in nearly all of them a pulse of a certain width is desired. If only a single circuit is to be built, any width pulse may be achieved merely by providing variable parameters and varying them until the proper time constant is achieved. However, where the monostable multivibrator is to be included in a production item such that many thousands or hundreds of thousands of the circuit are produced, it is desirable to have a circuit which will produce a constant width pulse for a certain set of fixed parameters which determine the time constant.

There has heretofore been no simple way to achieve this desired result when semiconductor switching devices are used, since each device exhibits a somewhat different transfer voltage. In one circuit with given time-constant parameters and switching devices with a certain transfer voltage, a pulse of one width would be produced, and in a second circuit using identical time-constant parameters but switching devices with a different transfer voltage, a pulse having a different width would be produced.

In addition to the above-noted problem, it is also desirable to be able to build a monostable multivibrator using as few discrete components as possible. Where an integrated circuit chip can be used to incorporate the switching devices, many discrete elements can be eliminated, such as transistors and the interconnections therebetween. Thus such an integrated circuit requires fewer external components with the resulting cost saving, weight and size reduction, and greater reliability.

It is an object of this invention to provide an improved monostable multivibrator.

In accordance with one embodiment of this invention there is provided a monostable multivibrator having two stitching devices, each of which has an input and an output. The output of the first device is connected to the input of the second device. There is also provided a first time-constant determining circuit coupled between the input of the multivibrator and the input of the first switching device and a second time-constant determining circuit coupled between the input of the second switching device and a point of reference potential.

The invention will be better understood when reference is made to the following FIGS. in which.

Figure 1:
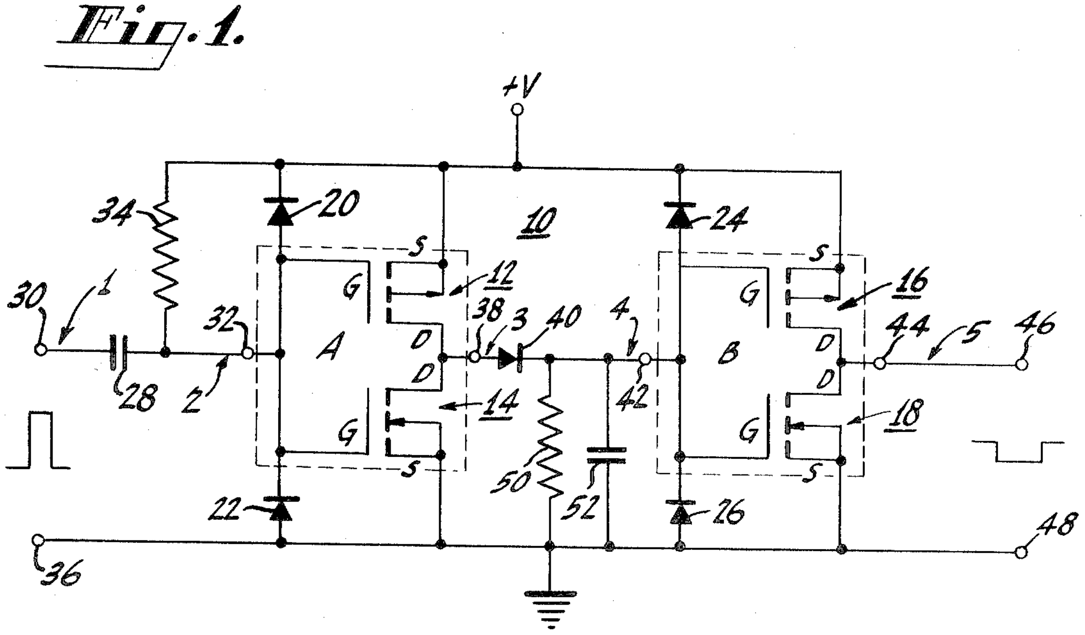
FIG. 1 is a schematic diagram of one embodiment of the invention.

FIG. 1 shows a monostable multivibrator circuit 10 which includes four enhancement-type metal oxide semiconductor (MOS) field effect transistors 12, 14, 16, and 18. Each of the transistors 12, 14, 16, and 18 includes a source, drain, and gate electrode designated respectively as the S, D, and G electrodes. Each of the transistors further has a base electrode which is the chip substrate designated as the one having an arrow head thereon and in each case the base electrode is directly coupled to the source electrode. Transistors 12 and 16 are P-channel devices as designated by the arrow pointing away from the device. Transistors 14 and 18 are N-channel devices as designated by the arrow pointing in towards the device.

The drain electrodes of transistors 12 and 14 are coupled together as are the drain electrodes of transistors 16 and 18. Similarly the gate electrodes of transistors 12 and 14 are coupled together and the gate electrodes of transistor 16 and 18 are coupled together. The source electrodes of transistors 12 and 16 are coupled to the positive terminal of source of direct current DC voltage (not shown), designated herein as +V, and the source electrodes of transistors 14 and 18 are coupled to the negative terminal of the source of DC voltage (not shown), designated herein as ground.

A diode 20 is connected between the gate electrode of transistor 12 and +V such that the anode is connected to the gate electrode of transistor 12 and the cathode to +V. A diode 22 is connected between the gate electrode of transistor 14 and ground such that the anode of diode 22 is connected to ground and the cathode of diode 22 is connected to the gate electrode of transistor 14. A diode 24 is connected between the gate electrode of transistor 16 and +V such that the anode of diode 24 is connected to the gate electrode of transistor 16 and the cathode of diode 24 is connected to +V. A diode 26 is connected between the gate electrode of transistor 18 and ground such that the anode of diode 26 is connected to ground and the cathode of diode 26 is connected to the gate electrode of transistor 18.

Connected in the manner described above, transistors 12 and 14 form a first complementary symmetry metal-oxide semiconductor (COSMOS) inverter circuit A and transistor 16 and 18 form a second COSMOS inverter circuit B. The input to each of inverter circuits A and B is the junction between the gate electrode connections and the output from each of inverter circuits A and B is the junction between the drain electrode connections.

Each of the inverters A and B operate such that when a voltage applied to the input thereof is below a certain value defined herein as the transfer voltage $V_{tr}$, the P-channel transistor in the inverter operates at or near saturation and the N-channel transistor is cut off. When the voltage applied to the input thereof is above the transfer voltage, the N-channel transistor operates at or near saturation and the P-channel transistor is cut off. Thus, for example, in the case of inverter circuit A, where the source of the P-channel transistor 12 is connected to a source of positive voltage, such as +V volts, and the source of the N-channel transistor 14 is connected to a point of reference potential, such as ground, the output 38 of the inverter will be equal to either (a) +V volts less the voltage drop across the source and drain of transistor 12 when transistor 12 is in saturation or (b) zero volts plus the voltage drop across the source and drain of the transistor 14 when transistor 14 is in saturation, depending upon whether the input voltage is respectfully below or above the transfer voltage. Since the source to drain voltage drop across either transistor 12 or 14 will be relatively small compared to +V volts when the transistor is in or near saturation, this voltage will be hereinafter neglected; therefore the output of the inverter circuit may be said to be either at +V volts or zero volts.

A capacitor 28 is connected between multivibrator input terminal 30 and the inverter circuit A input 32. A resistor 34 is connected between the junction of capacitor 28 with input 32 and +V. An input signal in the form of a pulse having a sharp negative going edge is applied between input terminal 30 and a second multivibrator input terminal 36, where terminal 36 is connected directly to ground. The output 38 of inverter circuit A is connected to the anode of diode 40; the cathode of diode 40 is connected to the input 42 of inverter circuit B. The output 44 of inverter circuit B is connected to one multivibrator output terminal 46; the other multivibrator output terminal 48 is connected to ground. Resistor 50 and capacitor 52 are connected in parallel between the junction of diode 40 and the input 42 of inverter circuit B and ground.

When inverter circuits A and B are on the same integrated circuit chip, they each will have substantially the same transfer voltage. It is desirable to have the transfer voltages of inverter circuits A and B as nearly equal as possible in any given single circuit, although this transfer voltage may vary from circuit to circuit. Thus, it is desirable to use an integrated circuit chip for the components forming inverter circuits A and B.

In some commercially available integrated circuit chips which contain inverter circuits, the chips are screened by the manufacturer thereof so that, where +V is equal to, for instance, 10 volts, the transfer voltages of the inverter circuits will not be below 3.3 volts, nor above 6.7 volts. The discussion given hereinafter therefore will be dependent upon the assumption that inverter circuits A and B have the same transfer voltage, that this transfer voltage is between 3.3 volts and 6.7 volts, and that +V equals 10 volts. However, these values are assumed only by way of example.

Figures 2, 3:
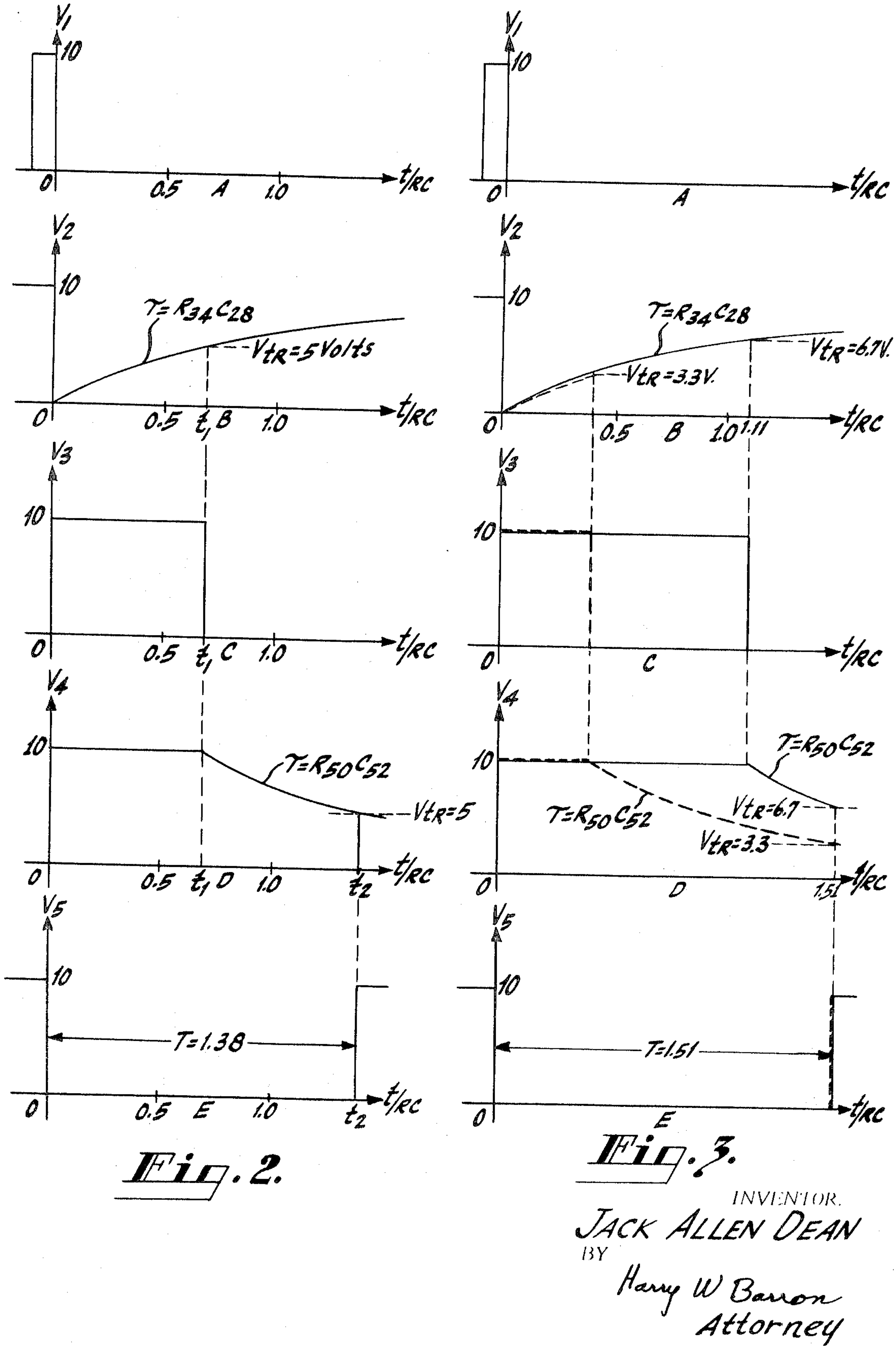
FIGS. 2 and 3 are waveform diagrams showing the operation of the circuit in FIG. 1.

The operation of circuit 10 will now be described with reference being made to the designated reference points 1, 2, 3, 4 and 5 as shown in FIG. 1 and with further reference being made to FIGS. 2A–2E and 3A–3E, each of which show five waveforms $V_1$, $V_2$, $V_3$, $V_4$, and $V_5$ which respectively represent the voltages with respect to ground at points 1–5. Reference is now made to FIG. 2 specifically in which the transfer voltages $V_{tr(A)}$ and $V_{tr(B)}$ of the inverter circuits A and B is assumed to be 5.0 volts.

Before any input signal is applied to circuit 10, voltage $V_2$ (FIG. 2B), which is applied to input 32 of inverter circuit A, is at 10 volts. Thus transistor 14 conducts and voltage $V_3$0 2C) is approximately 0 volts. Capacitor 52 is assumed to have completely discharged through resistor 50. Thus, voltage $V_4$ (FIG. 2D) will be at 0 volts and transistor 16 will be conductive so voltage $V_5$ (FIG. 2E) will be approximately 10 volts.

The input signal which is applied between terminals 30 and 36, will be assumed to be a pulse having a sharp negative-going trailing edge at time zero of a magnitude of 10 volts (FIG. 2A), although any signal which exhibits a sharp drop of at least 10 volts may be used. The leading edge of this pulse does not affect multivibrator 10 due to the presence of diode 20 which clamps voltage $V_2$, at point 2, to a maximum of 10 volts.

However, the trailing edge of the input pulse, which is assumed to occur at time zero herein, operates to lower voltage $V_2$, at point 2, to 0 volts. This happens because the voltage across capacitor 28 cannot change instantaneously, that is, since both voltage $V_1$ and voltage $V_2$ were at the same voltage just prior to the occurrence of the trailing edge, they must remain at the same voltage just after the occurrence of the trailing edge. Thus, when the trailing edge of the input pulse occurs, both voltage $V_1$ and voltage $V_2$ drop by 10 volts. Voltage $V_2$ cannot drop below ground potential due to the presence of diode 22, which clamps $V_2$ to ground. Thus, even if the magnitude of the input pulse were greater than 10 volts, voltage $V_2$ would only drop to 0 volts.

When voltage $V_2$ drops to ground potential, transistor 12, which previously had been nonconductive, begins conducting and transistor 14, which previously had been conducting, becomes nonconductive. Thus, the voltage $V_3$, appearing at point 3, rises to a value equal to approximately 10 volts, as seen in FIG. 2C. Since voltage $V_4$, at point 4, had previously been at ground potential, diode 40 becomes forward biased and conducts. Capacitor 52 charges to +V volts with a time constant equal to $C_{52}$ times the saturated source to drain resistance of transistor 12. Since this resistance is very low, capacitor 52 charges to +V volts almost instantaneously. Thus voltage $V_4$ becomes 10 volts, as seen in FIG. 2D and the voltage at the input terminal 42 of inverter circuit B rises above the transfer voltage $V_{tr(B)}$ thereof. Transistor 16, which previously had been conducting, ceases conducting and transistor 18, which previously had been nonconducting, begins conducting. Thus, the voltage $V_5$ at point 5, which is at output 44 of inverter circuit B, becomes approximately 0 volts as seen in FIG. 2E.

Once voltage $V_2$ drops to 0 volts, capacitor 28 begins charging up through resistor 34 towards a voltage equal to 10 volts with a time constant equal to $R_{34}C_{28}$. Thus, voltage $V_2$ begins to rise exponentially and it will eventually increase to the transfer voltage $V_{tr(A)}$ of inverter circuit A as happens at time $t_1$ in FIG. 2B. When this occurs transistor 12 returns to the nonconducting state and transistor 14 returns to the conducting state and thus voltage $V_3$ returns to 0 volts as seen in FIG. 2C at time $t_1$. However, since voltage $V_4$ is held at 10 volts by capacitor 52, diode 40 becomes reversed biased; capacitor 52 then discharges exponentially through resistor 50 with a time constant equal to $R_{50}C_{52}$. Thus, as seen in FIG. 2D after time $t_1$, voltage $V_4$ decreases exponentially towards 0 volts with a time constant equal to $R_{50}C_{52}$.

At time $t_2$ in FIG. 2D, voltage $V_4$ decreases below the transfer voltage $V_{tr(B)}$ of inverter circuit B and transistor 18 ceases conducting and transistor 16 begins conducting. At this time, voltage $V_5$ returns to 10 volts, as seen at time $t_2$ in FIG. 2E. Thus a pulse of width $T=t_1+t_2$ occurs between the output terminals 46 and 48 of multivibrator 10, as seen in FIG. 2E.

The width, $T$, of the pulse appearing between the output terminals 46 and 48 can be given mathematically as:

$$T=-R_{34}C_{28}\ln\left[\frac{V-V_{tr(A)}}{V}\right]-R_{50}C_{52}\ln\left[\frac{V_{tr(B)}}{V}\right]$$

where $R_{34}$ equals the resistance of resistor 34 in ohms, $R_{50}$ equals the resistance of resistor 50 in ohms, $C_{28}$ equals the capacitance of capacitor 28 in farads, $C_{52}$ equals the capacitance of capacitor 52 in farads, $V_{tr(A)}$ equals the transfer voltage of inverter circuit $A$ in volts, $V_{tr(B)}$ equals the transfer voltage of inverter circuit B in volts, and $V$ equals the voltage of the source +V in volts.

In order for $T$ to remain relatively constant over variations, from circuit to circuit, in the transfer voltages $V_{tr(A)}$ and $V_{tr(B)}$, it is desirable for the two time constants $R_{34}C_{28}$ and $R_{50}C_{52}$ to be as nearly equal as possible. As an example herein, it will be assumed that both $R_{34}C_{28}$ and $R_{50}C_{52}$ both equal one thousandth (0.001) of a second or 1 millisecond. Such would be the case, for instance, where resistors 34 and 50 are equal to 1,000 ohms and capacitors 28 and 52 are each equal to one microfarad. It is still assumed that +V is equal to 10 volts and that $V_{tr(A)}$ and another, $V_{tr(B)}$, which should be equal to one another, for best results, can vary between 3.3 and 6.7 volts. If, $V_{tr(A)}$ and $V_{tr(B)}$ are both equal to 5.0 volts which is the design value, then the width $T$ of the output pulse can be computed to be equal to a nominal value of 1.38 milliseconds. The waveforms shown in FIG. 2 graphically illustrate the situation where transfer voltages $V_{tr(A)}$ and $V_{tr(B)}$ each equal 5.0 volts.

If the transfer voltages $V_{tr(A)}$ and $V_{tr(B)}$ are each equal to the lowest possible value, that is 3.3 volts, then width $T$ can be calculated to be equal to 1.51 milliseconds. This situation is graphically shown in FIG. 3 by the dashed-line waveforms. On the other hand, if the transfer voltages $V_{tr(A)}$ and $V_{tr(B)}$ are each equal to the highest possible value, that is 6.7 volts, when width $T$ can be calculated to be again equal to 1.51 milliseconds. This situation is shown graphically in FIG. 3 by the solid-line waveforms. For values of the transfer voltages between 3.3 and 6.7 volts, the width $T$ will vary between 1.38 and 1.51 milliseconds. Thus, the maximum nominal value deviation error with multivibrator 10 will be less than +8 percent. This error is acceptable for most applications, since resistors and capacitors used may vary by as much as ±10 percent. This error can easily be reduced to substantially zero by merely adding a variable resistor (not shown) in series with either resistor 34 or resistor 50. In actual practice, where exact width outputs are required, it would be necessary to have such a variable resistor to compensate for resistor 34 and 50 and capacitor 28 and 52 variations. This same variable resistor could also be used to compensate for the transfer voltage variations, so in effect, neither extra components nor extra manual adjustments would be necessary to obtain near perfect accuracy.

When the transfer voltages $V_{tr(A)}$ and $V_{tr(B)}$ are not nearly equal, the maximum nominal value deviation error of +8 percent greatly increases. For instance, if $V_{tr(A)}$ was 3.3 volts and $V_{tr(B)}$ was 6.7 volts, $T$ would be equal to 0.80 milliseconds and if $V_{tr(A)}$ was 6.7 volts and $V_{tr(B)}$ was 3.3 volts, $T$ would be equal to 2.21 milliseconds. Thus where the two transfer voltages are not equal, an error of −58 percent to +60 percent would exist from the nominal value of $T$=1.38 milliseconds.

What is claimed is:

1. In combination:

a pair of terminals connectable to a source of DC voltage providing respectively a first voltage and a second lower voltage at said terminals;

first and second switching devices each coupled between said terminals and each having an input and an output, each of said devices providing a voltage representative of said first voltage to the output thereof when a voltage which is applied to the input thereof is below a certain transfer voltage associated with that device and each of said devices providing a voltage representative of said second voltage to the output thereof when a voltage which is applied to the input thereof is above said certain transfer voltage;

first time-constant determining means having a first time constant and being connected to the input of said first device, the signal appearing at the output of said first device having a time duration of a first certain time dependent upon said first time constant;

means including a second time-constant determining means for electrically connecting the output of said first device to the input of said second device;

said second time-constant determining means having a second time constant, the signal appearing at the output of said second device having a time duration of said first certain time and a second certain time, said second certain time being dependent upon said second time constant.

2. The invention according to claim 1 wherein said first and said second time-constant determining means each respectively comprises a resistance and capacitance, the values of the resistances and the capacitances being equal in said first and second time-constant determining means respectively.

3. The invention according to claim 1 wherein said first and second switching devices are each complementary symmetry metal-oxide semiconductor inverter circuits.

4. The invention according to claim 3 wherein said means connecting the output of said first device to the input of said second device includes a diode serially connecting the output of said first device to the input of said second device.

5. A multivibrator for providing a pulse signal at an output thereof in response to a signal applied to an input thereof, comprising:

a source of DC voltage having two terminals, there being respectively a more positive voltage and a less positive voltage at said terminals;

first and second switching devices each coupled between said terminals and each having an input and an output, each of said devices providing a voltage representative of said more positive voltage to the output thereof when a voltage which is applied to the input thereof is below a certain transfer voltage associated with that device and each of said devices providing a voltage representative of said less positive voltage to the output thereof when a voltage which is applied to the input thereof is above said certain transfer voltage, said transfer voltages of said devices being equal;

first means, including a serially connected first reactance and first resistance which has a first time constant associated therewith, coupled between said multivibrator input and one of said terminals, said reactance being coupled to said input, and means coupling the junction of said first reactance and first resistance to the input of said first device;

second means, including a diode, for connecting the output of said first device to the input of said second device, said diode being poled so that it is nonconductive whenever the output of said first device and the output of said second device have voltages thereat representative of the same terminal of said source; and third means, including a second reactance and a second resistance connected in parallel, and having a second time constant associated therewith, said third means being connected between said other terminal and the input of said second device, said first time constant being equal to said second time constant.

6. The invention according to claim 5 wherein said one terminal is the terminal having said more positive voltage thereat, said other terminal is the one having said less positive voltage thereat, said reactance is a capacitor, said input signal has a relatively sharp negative-going portion and the anode of said diode is coupled to the output of said first device, the cathode of said diode being coupled to the input of said second device.

7. The invention according to claim 5 wherein said first and second switching devices are each complementary symmetry metal-oxide semiconductor inverter circuits.

8. The invention according to claim 5 wherein said first and second switching devices are each complementary symmetry metal-oxide semiconductor inverter circuits which appear on the same integrated circuit chip.